United States Patent [19]
Anisimov et al.

[11] 3,831,045
[45] Aug. 20, 1974

[54] AIR-COOLED ELECTRIC MACHINE

[76] Inventors: Pavel Mikhailovich Anisimov, Tkatskaya ulitsa, 46, kv. 9; Boris Ivanovich Evgrafov, Chistye Prudy, 9, kv. 8; Jury Alexandrovich Kupeev, ulitsa 9-Rota, 15, kv. 11; Boris Petrovich Orlov, ulitsa 9-Rota, 15, kv. 29; Antonina Nikolaevna Kotova, Tashkentskaya ulitsa, 29/179 kv. 194; Galina Iosifovna Turok, Borisovskaya ulitsa, 18/12, kv. 9, all of Moscow; Pavel Gdalievich Berman, ulitsa Ushakova, 58, kv. 44, Kherson, all of U.S.S.R.

[22] Filed: Apr. 6, 1972

[21] Appl. No.: 241,526

[52] U.S. Cl. .................................. 310/52, 310/58
[51] Int. Cl. .......................................... H02k 9/00
[58] Field of Search ........... 310/52, 58, 59, 263, 53, 310/60–63, 89

[56]  References Cited
UNITED STATES PATENTS

| | | | |
|---|---|---|---|
| 2,157,191 | 5/1939 | Sinnett | 310/52 X |
| 3,027,470 | 3/1962 | Atherton | 310/59 |
| 3,517,504 | 6/1970 | Sakamoto | 310/263 X |

Primary Examiner—J. D. Miller
Assistant Examiner—Robert J. Hickey
Attorney, Agent, or Firm—Eric H. Waters

[57]  ABSTRACT

The present invention relates to air-cooled electric machines used as generators in vehicles.

The electric machine comprising a rotor, a stator having a winding and secured mechanically to bearing housings provided with vent passages made in the internal cylindrical surface thereof, according to the invention, is characterized in that said vent passages are arranged above the end portions of the stator winding disposed obliquely with respect to the longitudinal axis of the machine and intercommunicated through an annular chamber.

This embodiment of the machine ensures the improvement of cooling thereof and better utilization of active materials.

3 Claims, 2 Drawing Figures

AIR-COOLED ELECTRIC MACHINE

The present invention relates to electric machine building and, more particularly, to air-cooled electric machines used, e.g., as generators in vehicles, and to improvements in cooling components parts of such machines.

Air-cooled electric machines comprising a stator with a winding which is fixed in bearing housings, and a rotor having a shaft extending through the openings in said bearing housings, are widely known.

The above-mentioned machines are cooled with an air stream delivered by a fan into the internal space of the machine through ports provided in one of the bearing housings, and further through an air gap between the stator and rotor to be discharged into the ambient atmosphere through ports made in the other bearing housing. Furthermore, the bearing housings are provided with vent passages arranged in parallel with the longitudinal axis of the machines and ensuring additional suction of air. The air supplied through the passages contributes to the cooling of the end portions of the stator winding.

A disadvantage of this cooling system consists in a low efficiency of the stator winding cooling, since the main part of the cooling air stream passes through a very small air gap confined by the stator and rotor, the aerodynamic resistance of this gap being rather high.

It is an object of the present invention to eliminate the above disadvantages.

The invention consists in the provision of an air-cooled electric machine which permits to increase the efficiency of cooling of the end portions of the stator winding and of control circuit components incorporated in one of the bearing housings without alterations of the overall dimensions and complications in the structure of the machine.

The above objects are accomplished by that, according to the invention, in an air-cooled electric machine longitudinal vent passages made in the internal cylindrical surface of the bearing housings are arranged above the end portions of the stator winding obliquely with respect to the longitudinal axis of the machine and at an angle to the generatrix of the internal cylindrical surfaces of the bearing housings, said passages being inter communicated above the stator back, whereby the intensity of cooling of the end portions of the stator winding and the stator core periphery is considerably increased.

The vent passages may inter communicate through an annular cavity defined by the stator back and an annular yoke, which is mounted on the external surfaces of said bearing housings.

It is expedient to stagger the vent passages made in one of the bearing housings circumferentially relative to the passages made in the other bearing housing. This staggering of the passages elongates the path of the air flow within the annular cavity and improves heat emission from air to the stator back and the annular yoke. Furthermore, in order to eliminate distortion of the air stream at the output of the passages of one of the bearing housings and at the input of the passages of the second bearing housing, it is advantageous to dispose peripheral surfaces of the vent passages at an angle with respect to the generatrix of the bearing housings. Said angle should correspond to the staggering of the passages along the circumference of the bearing housings.

The electric machine built according to the present invention successfully accomplishes the above objects; with the electric machine embodied in this way the positive air flow cools the surfaces of the rotor and stator, as well as the end portions of the stator winding.

This cooling system of an electric machine is so efficient that it provides, to a large extent, for better utilization of active materials the over-all dimensions of the machine housing being the same.

To make the subject-matter of the present invention readily understood, the following detailed description of a preferable exemplary embodiment of the electric machine built according to invention is given with reference to the accompanying drawings, in which.

Figure 1:
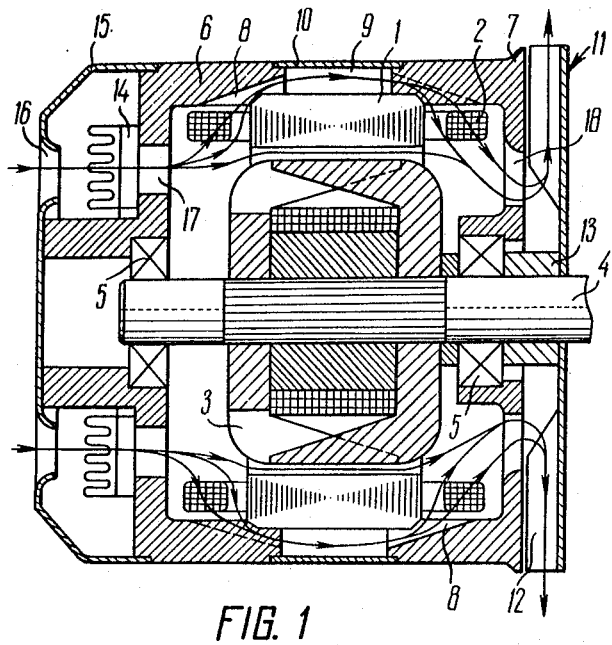
FIG. 1 shows a longitudinal section of the electric machine according to the invention.

An electric machine shown in FIG. 1 comprises a stator 1 having windings 2 said therein, a rotor 3 mounted on a rotatable shaft 4 in the stator 1. The shaft 4 is supported in bearings 5 mounted in bearing housings 6 and 7. The stator 1 is mechanically secured to the bearing housings 6 and 7.

Longitudinal vent passages 8 are made in the internal cylindrical surface of the bearing hosings 6 and 7, said passages being arranged obliquely with respect to the longitudinal axis of the machine. The vent passages 8 are inter communicated by an annular cavity 9 defined by the back of the stator 1 and an annular yoke 10 mounted on the external cylindrical portions of the bearing housings 6 and 7.

Mounted on the external side of the bearing housing 7 is a fan 11 having vanes 12 and a hub 13 mounted on the shaft 4.

The other bearing housing 6 mounts control circuit components 14 covered by a casing 15 having guiding slots 16 which are provided with flanges projecting into the internal space of the electric machine to direct the cooling air flow to the control circuit components 14.

In order to elongate the path of the air stream within the annular cavity 9, the vent passages 8 made in the bearing housing 6 are staggered circumferentially with respect to the vent passages 8 made in the bearing housing 7.

Figure 2:
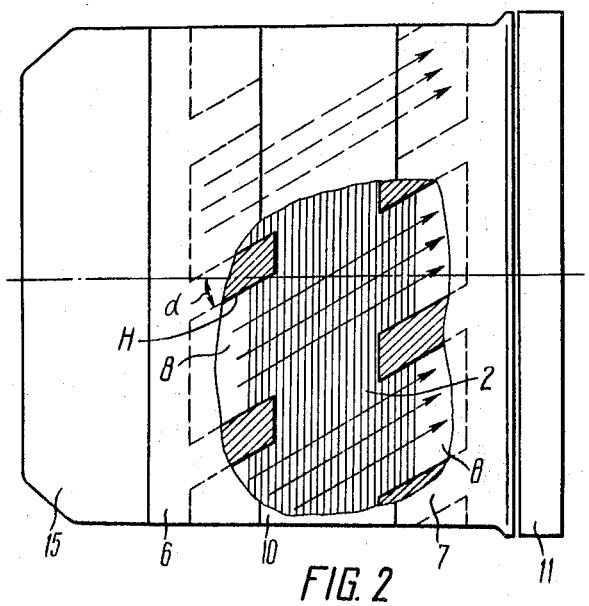
FIG. 2 is an air flow distribution diagram in vent passages of the machine according to the invention.

Furthermore, in order to eliminate distortion of the air stream at the output of the vent passages 8 the peripheral surfaces (H) of said passages 8 are positioned at angles $\alpha$ (FIG. 2) with respect to the longitudinal axis of the machine. The angle $\alpha$ corresponds to the staggering of the vent passages 8 along the circumference of the bearing housings 6 and 7.

The electric machine is cooled in the following manner.

When the rotor 3 of the electric machine rotates together with the fan 11 mounted on its shaft 4, the cooling air is taken into the guiding slots 16 of the casing 15 to cool the control circuit components 14, and is supplied into the internal space of the machine through vent ports 17 of the bearing housing 6. Then the air stream is divided and is delivered further in two directions.

One part of the stream passes through an air gap to cool the internal surface of the stator and rotor.

The other part of the stream is directed to the end portions of the stator winding 2, and then, passes through the oblique vent passages 8 of the bearing housing, the annular cavity 9, the vent passages 8 of the bearing housing 7 and is thrown out into atmosphere through vent ports 18.

While washing the end portions of the stator winding at one side of the stator, the air is heated and, then, is cooled after having entered the annular chamber to emit its heat to the stator back and to the annular yoke, whereafter the air thus flows along the vent passages to the end portions of the winding at the other side of the stator to flow outwards through the vent ports 18 of the bearing housing 7.

We claim:

1. An air-cooled electric machine, comprising a rotor; a pair of laterally spaced bearing housings each having external circumferentially cylindrical configurations; a stator having a winding and being secured in said bearing housings, said housings being provided with openings in the end walls thereof in the form of vent ports for the passage of cooling air therethrough; means forming an annular cylindrical wall extending between and interconnecting said bearing housings and being generally coextensive with the external cylindrical portions of said bearing housings so as to define an annular closed space about said stator, each said bearing housing having an internal cylindrical surface, and vent passages on the internal cylindrical surface of the bearing housings communicating with the annular closed space about said stator, said vent passages being provided in the zone of the end portions of said stator windings and extending at an angle to the longitudinal axis of the machine, the side surfaces of said passages intersecting the internal cylindrical surfaces of said housings in an angular relationship relative to the axis thereof.

2. An air-cooled electric machine according to claim 1, said stator including a stator back, said vent passages communicating with each other by means of said closed annular space defined by the stator back and said housing connecting means being an annular yoke mounted on the external cylindrical portions of the bearing housings extending about the entire machine.

3. An air-cooled electric machine according to claim 1, said vent passages of one of the bearing housings being circumferentially offset with respect to the vent passages of the other bearing housing.

* * * * *